United States Patent [19]

Mader

[11] Patent Number: 4,701,860
[45] Date of Patent: Oct. 20, 1987

[54] INTEGRATED CIRCUIT ARCHITECTURE FORMED OF PARAMETRIC MACRO-CELLS

[75] Inventor: James M. Mader, Indialantic, Fla.

[73] Assignee: Harris Corporation, Melbourne, Fla.

[21] Appl. No.: 709,138

[22] Filed: Mar. 7, 1985

[51] Int. Cl.$^4$ .................... G06F 15/60; H03K 3/26
[52] U.S. Cl. .................... 364/490; 307/303; 364/488; 437/51
[58] Field of Search ............... 364/488–491; 307/303; 29/569 R, 577 C

[56] References Cited

U.S. PATENT DOCUMENTS

| | | | |
|---|---|---|---|
| 4,240,094 | 12/1980 | Mader | 29/577 C |
| 4,377,849 | 3/1983 | Finger et al. | 364/491 |
| 4,484,292 | 11/1984 | Hong et al. | 364/491 |
| 4,584,653 | 4/1986 | Chih et al. | 364/488 X |

OTHER PUBLICATIONS

Szepieniec et al; "The Genealogical Approach to the Layout Problem"; Automation Confer. (ACM) 1980; pp. 535–542.

Koide et al; "Building Block Approach & Variable Size Memory for CMOS VLSIs"; IEEE Int.Solid-State Ckts Conf. 1983; pp. 148–149.

Sugiyama et al; "Data Processing System of E-B Litho. for VLSI Microfabrication"; IEEE Trans Electron Dev. Apr. 1979 (vol. ED-26 No. 4); pp. 675–685.

*Primary Examiner*—Errol A. Krass
*Assistant Examiner*—Kevin J. Teska
*Attorney, Agent, or Firm*—Antonelli, Terry & Wands

[57] ABSTRACT

An integrated circuit architecture methodology effectively comprises the use of high level building blocks (termed macro-cells) that are composed of a customized arrangement of a number of smaller but readily chip-layout repeatable building blocks termed micro-cells. The size of each macro-cell is determined by signal processing design/performance/operational parameters of the system. The internal configuration geometry and signal port connections of each microcell are customized for circuit packaging density, performance and interconnectability with other micro-cells.

10 Claims, 10 Drawing Figures

| AND | AND | AND | AND |
|-----|------|------|------|
| AND | MULT. | MULT. | MULT. |
| AND | MULT. | MULT. | MULT. |
| AND | MULT. | MULT. | MULT. |
|     | ADD | ADD | ADD |

INTERIOR MULTIPLIER CELL (MCj) 27 TRANSISTORS

FIG. 9.

| AND | AND | AND | AND | AND | AND | AND |
|-----|------|------|------|------|------|------|
| AND | MULT.| MULT.| MULT.| MULT.| MULT.| MULT.|
| AND | MULT.| MULT.| MULT.| MULT.| MULT.| MULT.|
| AND | MULT.| MULT.| MULT.| MULT.| MULT.| MULT.|
| AND | MULT.| MULT.| MULT.| MULT.| MULT.| MULT.|
|     | ADD  | ADD  | ADD  | ADD  | ADD  | ADD  |

INTEGRATED CIRCUIT ARCHITECTURE FORMED OF PARAMETRIC MACRO-CELLS

FIELD OF THE INVENTION

The present invention relates to integrated circuit chip technology and is particularly directed to a scheme for optimizing the methodology for the architectural configuration of high complexity integrated circuits.

BACKGROUND OF THE INVENTION

Since the advent of the integrated circuit the electronics system designer has employed a number of circuit architectures for realizing an eventual microminiaturized implementation of an original signal processing system. In the early days of integrated circuit development the semiconductor engineer performed what was essentially a manual translation of the original circuit design, so as to provide an architecture that was effectively a customized version of each of the circuits contained within the system. Because each chip architecture was specifically and principally manually tailored to map the circuit components of the system onto a wafer environment, the eventual production costs of the final realization of the system, in terms of man hours necessary to map, resulted in a price per unit that could be prohibitively expensive in the commercial marketplace for small volumes of parts. The cost of this mapping or translating activity (man-hours, schedule uncertainty, re-cycles due to multiple errors) could create an economic barrier to the electronic system designer's use of available technology.

In an attempt to insert a "standardization" factor into the design and manufacture of chip architectures, for the purpose of reducing design mapping or translation complexity and cost, user involvement design schemes were proposed. A first of these schemes, termed the gate array, employs a chip architecture that contains dedicated geographic areas on the chip within which are disposed either elemental circuit devices (transistors or gates) or interconnect highways, through the selective intercoupling of which an overall circuit design can be mapped into silicon. Typically, in a gate array architecture, some small percentage of the available area of the chip contains an array of logic gates (e.g. two-input NAND gates). Another portion (and larger region) of the chip is provided with wiring/interconnect channels through which selected ones of the gates may be interconnected to realize a desired multi-function logic circuit. Unlike the custom integrated circuit approach, discussed supra, in which the semiconductor designer is required to customize a chip architecture to map a given system's circuits, the gate array scheme places a limit on the freedom of design of the system engineer: all circuits of the system must obey ground rules governed by the types and availability of the gates and interconnects of the array layout. Because of the vast complexity that any particular instantiation of the eventual logic design may take, a substantial portion of the chip is reserved for interconnects for the gates, typically limiting the useful active area of the chip to ten percent or less. As a result, not only is circuit packing density reduced, but because of the substantial signal propagation interconnect path area, circuit speed is reduced, thereby adversely affecting system performance.

In an effort to improve upon both the active area availability and the limited resources with which the system designer had to work, chip architecture development evolved from the gate array approach into the use of "standard cells". In accordance with the standard cell technique, a prescribed library of types of restricted-function building blocks (e.g. inverters, up/down counters) are provided for design implementation. Using manual or automatic routing techniques, a system design of any magnitude can be mapped to silicon, subject to photolithographic and yield constraints. The resulting silicon version of the system resembles the gate array in structural appearance: comparatively small regions of active area separated by large areas of interconnections of the standard cells. Unlike the gate array approach wherein the system designer was confined to circuit-implement all system functions using a fixed quantity of very basic components (gates), the standard cell approach offers somewhat improved flexibility in that the level of circuit design has reached a slightly higher degree of sophistication, as the basic building blocks are not limited to only a single type, nor are they limited to a very rudimentary (e.g. gate or transistor) level. Still, like the gate array architecture, most of the chip (80%) is reserved for interconnects, so that the active area and, consequently circuit speed, remain undesirably limited. Moreover, the limited variety of available standard cells still forces the system designer to spend a considerable amount of time on an architectural implementation plane that is essentially a "don't care" exercise, and consequently, not cost effective. Specifically, in either the gate array or the standard cell methodology the system designer is forced to decompose his system level block diagram to the limited set of building blocks of low complexity.

SUMMARY OF THE INVENTION

In accordance with the present invention there is provided a new and improved integrated circuit architecture methodology that effectively comprises an optimum blend of the positive aspects of both customized and building block approaches to implementing large scale (system) circuit functions in a single semiconductor chip. Auspiciously, the architecture methodology of the present invention offers the system designer a substantial variety of high level building blocks (termed macro-cells) that are composed of a customized arrangement of a number of smaller but readily repeatable, highly chip-densified, building blocks termed micro-cells. The size of each macro-cell, i.e. the number of micro-cells it contains, is determined by design/performance/operational parameters of the system engineer, hence the name "parametric" macro-cell.

The internal configuration geometry and signal port connections of each microcell are customized for circuit packaging density, performance and interconnectability with other micro-cells of a given macro-cell. For example, a micro-cell might correspond to one memory cell of which a read only memory (ROM) may be constituted. To implement the architecture of such a memory of a particular size, one only needs to know the desired capacity of the memory. Memory layout is then substantially simply a matter of arraying repeatable copies of the individual micro-cell until the sought after capacity is attained. Repetition of other ROM micro-cells (e.g. address decoder) are similarly repeated as required. Namely, the resulting memory is customized to fit the needs of the system designer. Because all macro-cell building blocks, regardless of their intended functions, are similarly configurable of prescribed microcells, the present invention offers to the system engineer a very high level design tool for realizing a system architecture that enjoys the manufacture repeatability of gate array and standard cell approaches, but also offers an eventual architecture design that has been customized by the circuit control parameters of the system level designer. Namely, because each parametric macro-cell has been prehandcrafted for optimum use of wafer real estate occupation area and efficiency of interconnections among cells, once the system level designer has completed his system design effort using a high level building block library, there is effectively no substantial additional silicon level design work on the part of the chip design engineer.

BRIEF DESCRIPTION OF THE DRAWINGS

FIG. 9 shows a processor-generated chip architecture layout of a $5 \times 7$ multiplier macro-cell comprised of micro-cells of FIGS. 2, 3 and 4;

DETAILED DESCRIPTION

Figure 1:
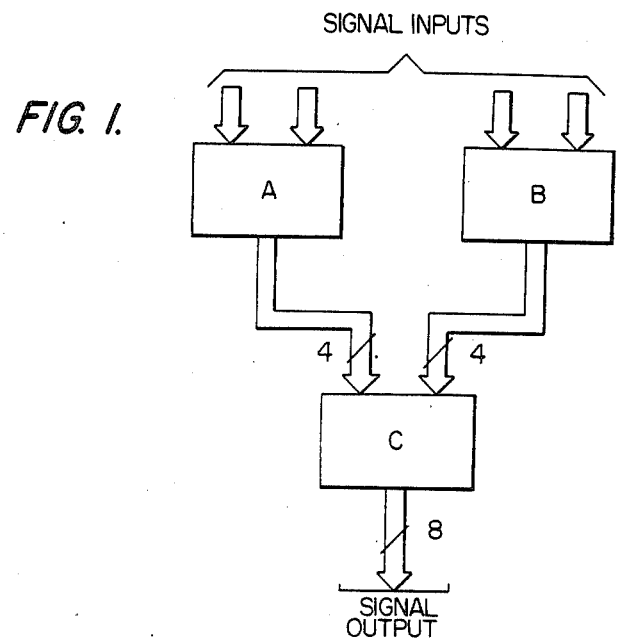
FIG. 1 shows a portion of a block diagram of a digital logic system design.

In order to facilitate an understanding of the description, infra, of the architecture design methodology of the present invention, it is first useful to set forth the definitions of terms to be used:

Parametric macro-cell (PMC)—one of a library of commonly used MSI to LSI complexity logic blocks dimensioned by the digital logic system designer in one or two dimensions and comprised totally of micro-cells;

Micro-Cell (MC)—one of the elements of a given parametric macro-cell which is hand-crafted to conform with the logic function and signal flow requirements of that particular parametric macro-cell. An "assembly" of micro-cells (of several types) is processor controlled in order to "compile" the specific N OR NXM instantiation of a logic design;

Standard Cell—one of a library of simple (one to five gate complexity) logic elements which can be used by the digital designer to intercouple or "glue" together parametric macro-cells; standard cells are of a fixed height and variable width to permit the use of LSI auto routing programs for implementing pseudo macros;

As mentioned briefly above, in accordance with the application of the chip architecture methodology of the present invention, the digital logic system designer is provided with a library of high level, functional building blocks (macro-cells) that may be individually tailored to meet the specific functional requirements of the designer prior to their being reduced to concrete form on a semiconductor chip. As an illustration, consider the following Table 1 of a variety of parametric macro-cells which represents a reasonably complete list of functional building blocks that digital logic system designers customarily use in the course of laying out a block diagram of a signal processing system such as, for example, a Viterbi decoder.

TABLE 1

FUNCTIONAL BUILDING BLOCK

N Bit Register; Set Scan
N BIT Comparator
N BIT Ripple Adder
$N \times M$ BIT RAM
N BIT Counter
$N \times 2:1$ Multiplexer
N BIT Priority Encoder
$N \times M$ ROM
$N \times 8:1$ Multiplexer
N BIT Up/Down Counter
$N \times N$ 2's Complement Multiplier
$N \times M$ Unsigned Binary Multiplier
N BIT Tri-State Buffer
N BIT Fast Adder
N BIT 4 to 1 MUX
$N \times M$ Programmable Shifter
$N \times N$ 2's Complement Pipeline Multiplier As will be observed from Table 1, all building blocks are of variable capacity in one or two dimensions. Accordingly, the digital designer can prescribe, parametrically, the size of a particular building block to handle, with maximum efficiency, a specified signal processing task, as opposed to having to settle for a larger scale device only a portion of which may be used. For example, using the parametric macro-cell library of Table 1, a designer who needs an $11 \times 11$ two's complement multiplier can enlist all of the signal processing capability of the device he has selected, as opposed to effectively wasting 70% of the processing power of a fixed $16 \times 16$ non-parametric multiplier. Similarly, the designer is not required to build the example $11 \times 11$ multiplier from low gate complexity elements, as would be the usual case in either gate array or standard cell methodologies.

As pointed out previously, because of its flexibility the chip architecture methodology of the present invention is not only more user oriented (compared to the more basic gate array and standard cell approaches) but, because of its "customizing of microcells", it effectively optimizes the use of the available area of the chip within which the system layout is to be implemented.

In the explanation to follow a detailed description of the methodology of the present invention will be presented for a specific example of a particular parametric macro-cell (here an $(N=4) \times (M=4)$ multiplier). This is done in order to facilitate an appreciation of the procedure that is carried out in accordance with the present invention in the course of designing and implementing a semiconductor chip-based architecture for a selected digital logic system function. It is to be understood, however, that while the explanation is presented for a particular functional logic block, it is equally applicable for realizing any other logic function that the designer may select from his library of macro-cells.

Moreover, for purposes of the present description, no detailed explanation of a particular semiconductor wafer processing technique, including mask set definitions, multi-layer interconnect structure, etc., with which the skilled artisan is familiar and customarily employs in present day semiconductor manufacturing processes, will be given. For the uninitiated reader, reference may be had to published literature, including semiconductor manufacturer's data books where appropriate.

Referring now to FIG. 1, there is shown a portion of an overall functional block diagram of a digital logic system, individual blocks A, B and C of which correspond to selected ones of a library of functional elements, such as those listed in Table 1 above, from which the logic designer creates an arrangement of such functional blocks for solving a particular signal processing problem of interest. As pointed out above, to provide an illustrative example of the invention, it will be assumed that the design calls for a 4×4 unsigned binary multiplier as block C in FIG. 1, with each of blocks A and B supplying respective four-bit binary signals to the respective inputs of multiplier block C and multiplier block C producing in response an eight bit product at its output. A and B might be, for example, N=2 Bit ripple adder parametric macro-cells.

Given the functional (and parametric) definition of each of the building blocks of the overall system design, (such as the use of a 4×4 multiplier as block C) as generated by the system designer, it is then a matter for the semiconductor engineer responsible for implementing the system layout to configure the required chip architecture. Advantageously, because each parametric macro-cell definition is implementable by a combination of micro-cells customized or tailored to match the design parameters of the functional block, the resulting architecture enjoys a chip real estate usage far in excess of conventional building block schemes, (e.g. gate array, standard cell methodologies) but does not incur the inordinate production costs of a purely customized design.

Figure 1A:
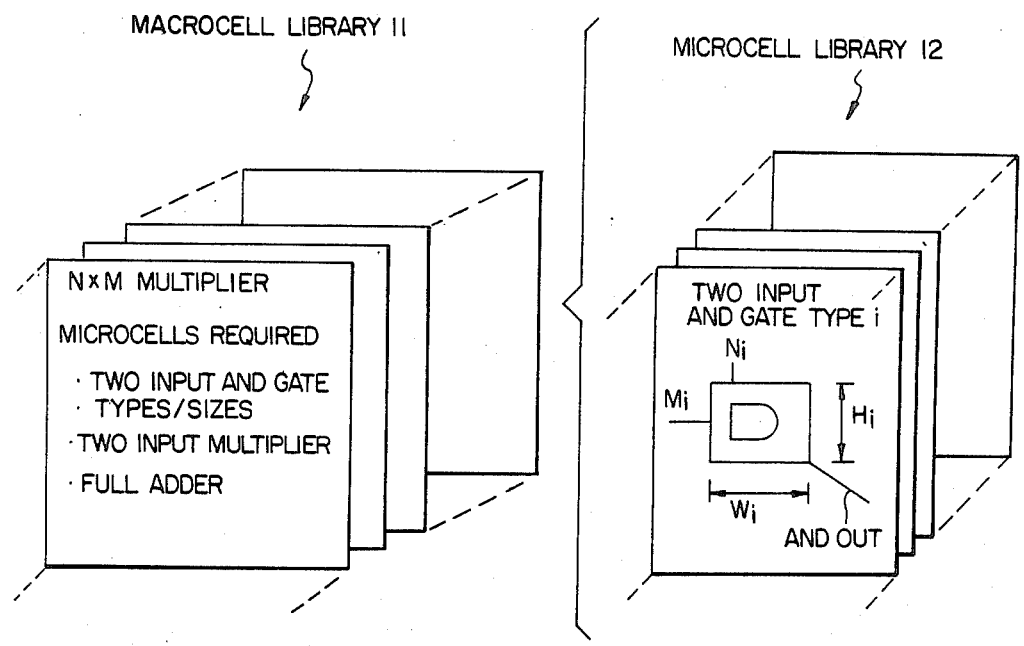
FIG. 1A is a diagrammatic illustration of respective macro-cell and micro-cell libraries by which components for generating the architecture of a digital logic system design are defined.

More particularly, continuing with the example of the 4×4 multiplier, as diagrammatically illustrated in FIG. 1A, the architecture designer has available to him a library 11 of macro-cells, such as those listed in Table 1, each of which is defined in terms of an auxiliary library 12 of micro-cells, the characteristics (parameters) of which are stored in associated processor memory of the terminal used by the semiconductor designer. The micro-cells perform a lower level of signal processing functions, such as logic gates, full adders, half adders, single bit multiplier cells, etc. from which to customize the higher level functions of the blocks (macro-cells) of the system layout. For each of these lower level logic elements signal interface ports and power supply connections may be predefined on a two dimensional basis to optimize side-by-side interconnections of micro-cells. In the library of macro-cells 11 of Table 1, the N×N unsigned binary multiplier is defined as a combination of three digital logic function elements: two input AND gate micro-cell; multiplier micro-cell and full adder micro-cell. Each different type of micro-cell is catalogued in micro-cell library 12. For example, for the AND gate arrangement, three different sizes are defined, as will be more fully understood from the detailed description to follow, particularly with reference to FIG. 5.

Figure 2:
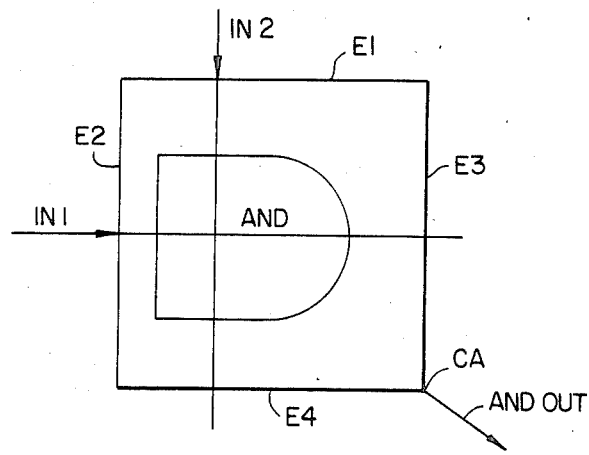
FIG. 2 is a circuit block representation of a two input AND gate micro-cell illustrating the geometry and signal coupling ports of the micro-cell.
Figure 3:
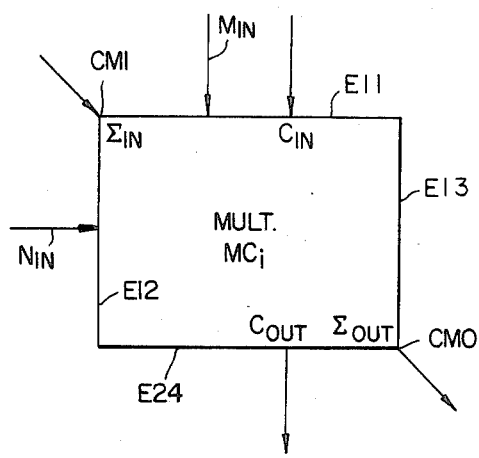
FIG. 3 is a circuit block representation of a multiplier micro-cell illustrating the geometry and signal coupling ports of the micro-cell.
Figure 4:
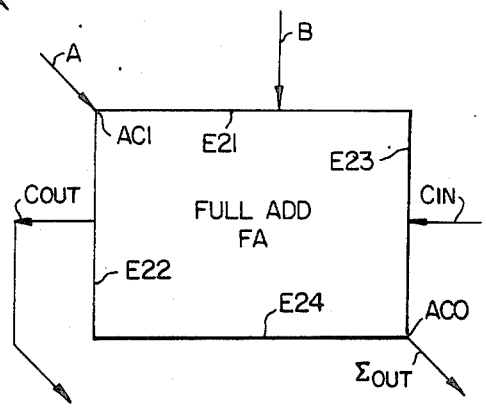
FIG. 4 is a circuit block representation of a full adder micro-cell illustrating the geometry and signal coupling ports of the micro-cell.

An example of this interconnection architecture is illustrated in FIGS. 2, 3 and 4, which respectively illustrate the chip geometries, including signal coupling ports, of a two-input AND gate, a multiplier cell and a full adder. As shown in FIG. 2, the geometry of a two-input AND gate cell may be rectangular and has input ports IN 1 and IN 2 terminating adjacent to orthogonal edges E1 and E2, while output port AND out is located at corner CA where edges E3 and E4 of the two-input AND gate intersect. In accordance with rectangular geometry of the AND gate, opposite edges E1 and E4 are parallel with one another and orthogonal to opposite parallel edges E2 and E3. For the specific geometry of the two-input AND gate of FIG. 2, the height H or separation between opposite parallel edges E1 and E4 is effectively the same as the width W or separation between opposite parallel edges E2 and E3, so that the actual shape of the AND gate is that of a square. However, the library of micro-cells contains additional sizes of the geometry for realizing the two-input AND function so as to provide different geometry/signal port alignment capability for integration into a selected parametric macro-cell design, as will be explained in more detail below.

In FIG. 3, the geometry of a multiplier cell is shown as being rectangular and as having respective input ports $M_{in}$ and $N_{in}$ for the multiplier and multiplicand bits terminating adjacent to orthogonal edges E11 and E12. Similarly, a carry-in port $C_{in}$ terminates adjacent to edge E11 but is spaced apart from multiplier input port $M_{in}$ along that edge. A carry output port $C_{out}$ terminates at a position adjacent to edge E14 opposite to the position at edge E11 whereat carry input port $C_{in}$ is provided. At diagonally opposed corners CMI and CMO are disposed summation input $\Sigma_{in}$ and output $\Sigma_{out}$ ports respectively, corner CMI being located at the intersection of edges E11 and E12, and corner CMO being located at the intersection of edges E13 and E14 of the multiplier cell.

FIG. 4 shows the rectangular geometry of a full adder cell FA being defined by opposite parallel edges E21, E24, that are orthogonally disposed with respect to a pair of parallel opposing edges E22, E23. The distance between opposite parallel edges E22 and E23 of full adder cell FA effectively corresponds to the distance between opposite parallel edges E12 and E13 of multiplier cell MULT (FIG. 3). A first input port A is provided at the intersection ACI of edges E21 and E22, while a second input port B is disposed adjacent to edge E21 at effectively the same position thereat that the carry out output port $C_{out}$ of the multiplier cell of FIG. 3 is provided. A carry-in input port $C_{in}$ is provided at edge E23 while a carry-out output port $C_{out}$ is provided at edge E22 opposite the location of carry-in input port $C_{in}$ at edge E23. A sum output port $\Sigma_{out}$ is provided at the intersection of edges E23 and E24 diagonally opposite the intersection of edges E21 and E22.

As pointed out above, using the micro-cells having the geometries and signal port arrangements of the two-input AND gate, multiplier and full adder block representations of FIGS. 2, 3 and 4, respectively, the semiconductor chip designer is equipped to customize an N×M multiplier architecture as parametrically defined by the system level block diagram supplied by the digital logic system design engineer. Such a customized multiplier architecture is configurable from the above described micro-cells in the manner shown in FIG. 5. As shown therein and as will be described in detail below, an N×M multiplier (here N=4, M=4) is configurable from an array of micro-cells arrayed as a densely packed (N+1)×(M) matrix. For the present example the matrix consists of N+1=five rows R0–R4 and M=4 columns C0–C3. Each of a first set of four input lines M0–M3 as the four bit multiplier is coupled to the input port IN 2 of each of AND gates AND 1, AND 2, AND 3 and AND 4 of row R0. The geometries of each of these gates are such that the separation between opposite parallel sides E1 and E4 (see FIG. 2) is the same. Also for each of AND gates AND 2, AND 3 and AND 4 the separation between opposite parallel edges E2 and E3 is the same. Each of a second set of four input lines N0–N3 as the four bit multiplicand is coupled to the input port IN 1 of each of AND gates AND 1, AND 5, AND 6 and AND 7 of column C0. The geometries of each of these gates are such that the separation between opposite edges E2 and E3 (see FIG. 2) is the same. Also, for each of AND gates AND 5, AND 6 and AND 7, the separation between opposite parallel edges E1 and E4 is the same.

Disposed in row R4 are respective full adders FA1, FA2 and FA3. The geometry of each full adder is such that the separation between opposite parallel edges E22 and E23 (see FIG. 4) is the same and corresponds to that between edges E2 and E3 of AND gates AND 2, AND 3 and AND 4, referenced above. Because of the alignment of the opposite edges E21 and E24 of adder FA1–FA3 in row R4, the carry inputs and outputs are aligned for direct intercoupling, as shown.

Figure 5:
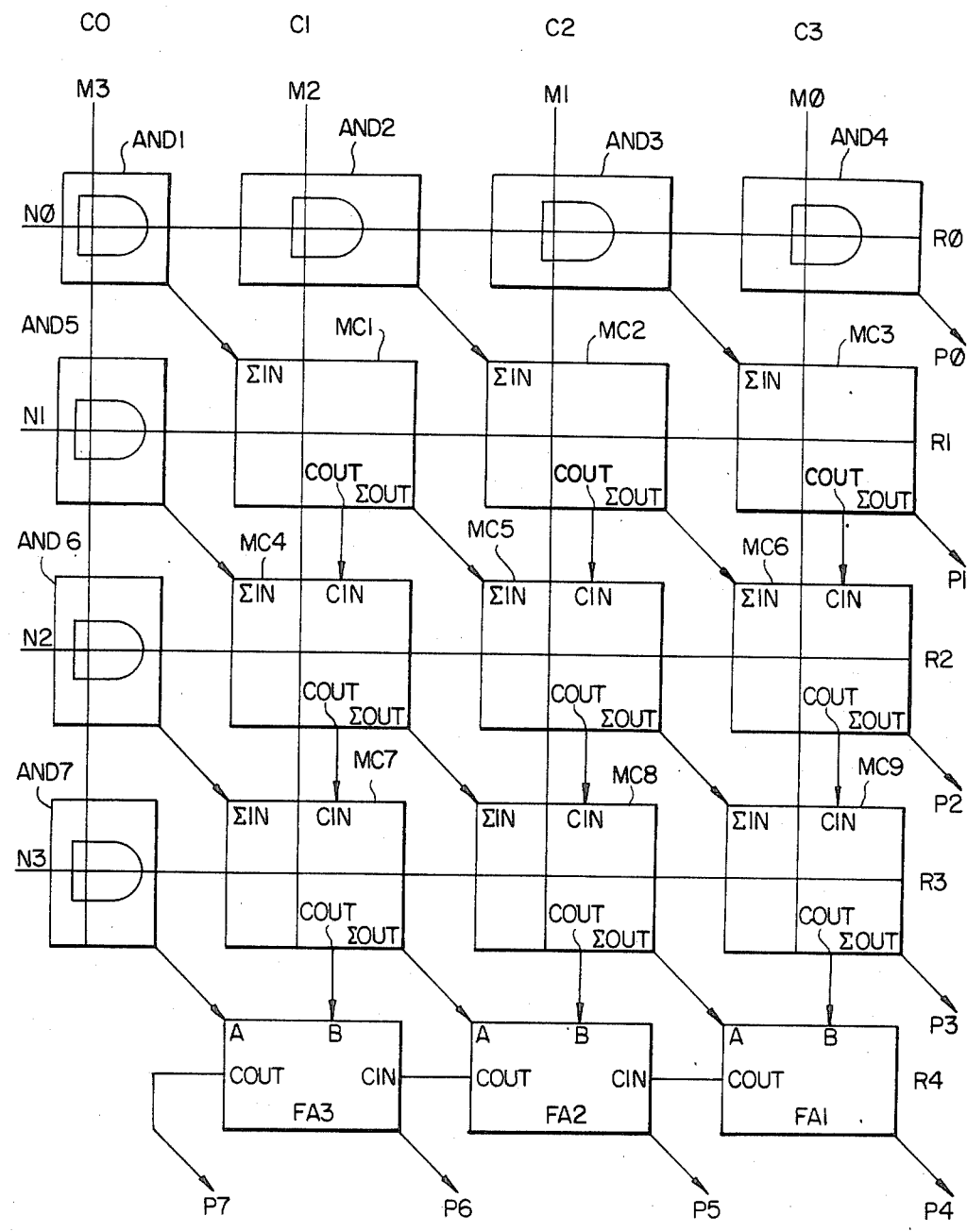
FIG. 5 shows a chip architecture layout of a $4 \times 4$ multiplier parametric macro-cell comprised of the micro-cells of FIGS. 2, 3 and 4.

Also contained within the matrix of FIG. 5 are multiplier cells MC1–MC9, each of which has the same rectangular geometry, and the opposite parallel edges of which correspond to those of the respective AND gates of the rows and columns in which they are disposed. Thus, for example, the separation between opposite parallel edges E12, E13 of multiplier cell MC5 in column C2 is the same as that between edges E2, E3 of AND gate AND 3 in column C2, and the separation between opposite parallel edges E11, E14 of multiplier cell MC 5 in row R2 is the same as that between edges E22, E23 of AND gate AND 6 in row R2.

Because all outputs (AND$_{out}$, $\Sigma_{out}$) of each rectangular geometry micro-cell are at the same corner (lower right as viewed in FIGS. 2–5) of the cell, and because each multiplier MC$_i$ and full adder FA$_i$ has an input at the same corner (upper left as viewed in FIGS. 3–5) of the cell diagonally opposite to the output, effectively direct (minimal interconnect tracks) connections between adjacent cells of the matrix can be readily accomplished. Moreover, connections between adjacent micro-cells is further facilitated by the coalignment of other signal coupling ports among the micro-cells, such as the carry-out C$_{out}$, carry-in C$_{in}$ ports of the multiplier cells MC$_i$ and adder cells FA$_i$. (It is noted in the configuration of FIG. 5 that the carry-in C$_{in}$ input ports of multiplier cells MC1–MC3 are unused.)

As described above and as shown in FIG. 5, the geometries of all of the micro-cells of a given macro-cell are such that the dimensions (lengths of edges) of adjacent micro-cells effectively match one another. However, not all micro-cells have the same dimensions or occupy the same chip area. For example, the internal circuitry configuration of a two-input AND gate, such as AND gate AND 1, is considerably less complex than and accordingly does not require the same amount of chip real estate as that of a multiplier cell, such as MC5.

Figures 6, 8:
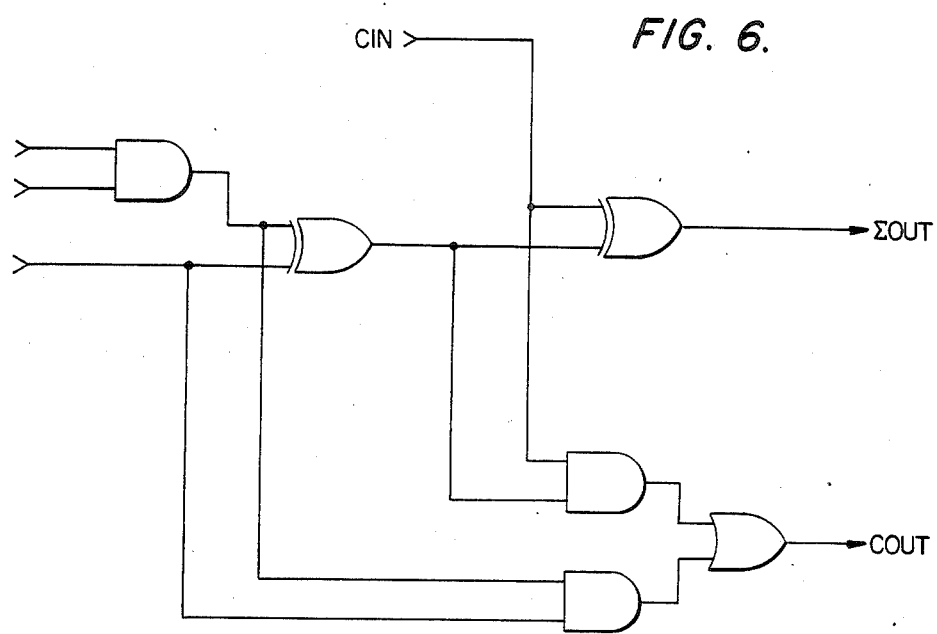
FIG. 6 shows a digital logic schematic circuit illustration of the multiplier micro-cell of FIG. 4.
FIG. 8 shows a processor-generated chip architecture layout of the $4 \times 4$ multiplier macro-cell of FIG. 5.
Figure 7:
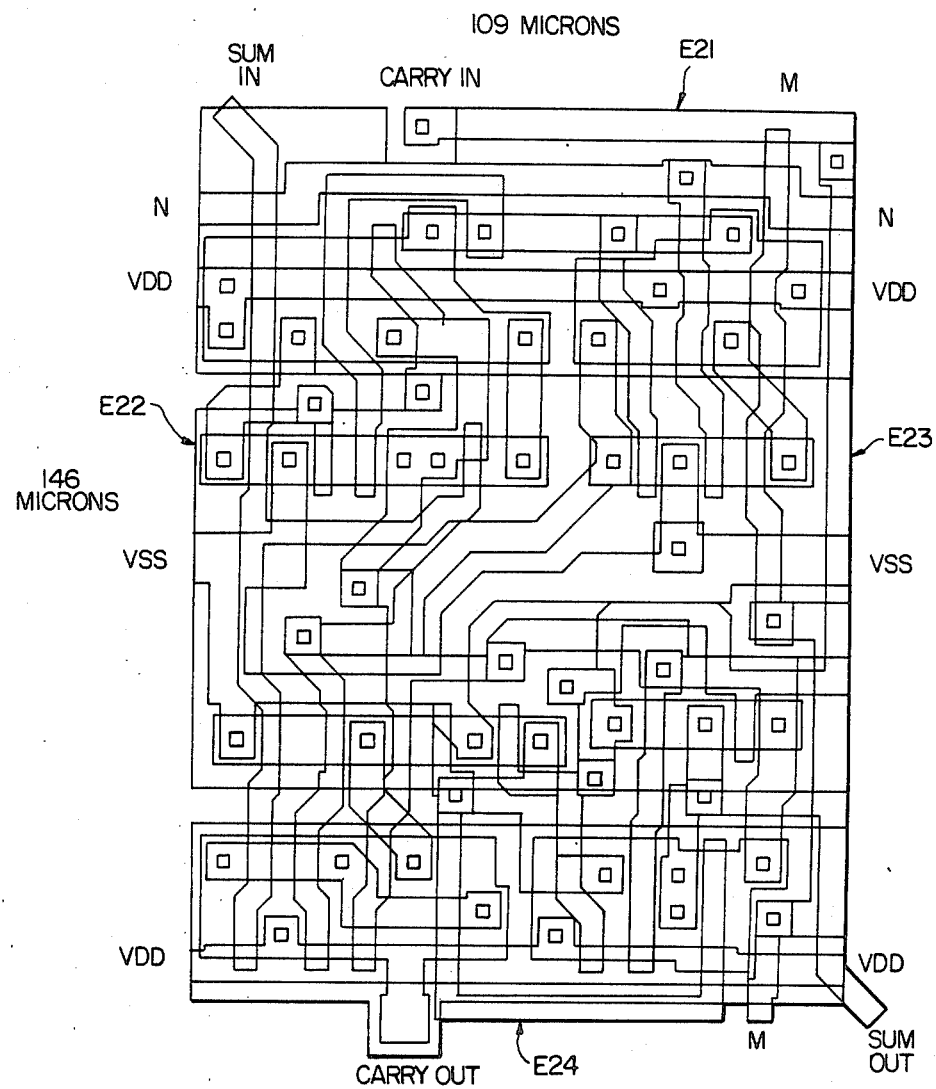
FIG. 7 shows a chip plan view of the circuit architecture for implementing the digital logic circuit of the multiplier micro-cell of FIG. 6.

As an illustration, a multiplier micro-cell MC$_i$ may be circuit-configured of a plurality of interconnected logic gates (AND, OR, exclusive-OR) as shown in FIG. 6, a corresponding chip plan view architecture layout for which is shown in FIG. 7, it being noted that the signal (and power) coupling ports of the architecture layout of FIG. 7 effectively correspond to the schematic-block port locations of FIG. 4, so that the geometry arrangement of micro-cells of FIG. 5 does accurately reflect the actual architecture interfacing among adjacent micro-cells. In terms of present day semiconductor production resolution capability, the multiplier micro-cell of FIG. 7 has a separation between edges E22 and E23 on the order of 109 microns, and a separation between edges E21 and E24 on the order of 146 microns for three micro CMOS process. Of course, different technologies and progress in lithography of a given technology will change the dimensions of the micro-cell. As pointed out previously, as a description of the details of the wafer manufacturing process for the architectures of the individual micro-cells, (such as the multiplier micro-cell of FIG. 7, which maps the interconnected logic gate arrangement of FIG. 6) is not necessary for an understanding of the present invention, no additional description of FIGS. 6 and 7 will be provided here.

While it would be possible to make all micro-cells of the same size and shape, the occupation area on the chip for a given arrangement of micro-cells to produce a prescribed macro-cell would be unnecessarily large, as it would be dictated by the size of the most complex micro-cell. Thus, the library of micro-cells contains assortments (in terms of size and shape) of a given circuit function micro-cell, such as a two input AND gate. For example, in the configuration shown in FIG. 5, it can be seen that three different sizes and shapes of a two-input AND gate are used to implement the 4×4 multiplier. Each of AND gates AND 2, AND 3 and AND 4 is dimensioned so that the dimensions of edges E4 adjacent edges E11 of multiplier cells MC$_i$ effectively match one another to provide columnar alignment in the matrix. Similarly, edges E3 of AND gates AND 5, AND 6 and AND 7 match the edges E12 of multiplier cells MC1, MC4 and MC 7 respectively, to provide alignment in rows R1, R2, R3 of the matrix. The other dimensions of the AND gates are reduced to save chip real estate. Thus, the separation between edges E1 and E4 of AND gates AND 2, AND 3 and AND 4 is less than that between their edges E2 and E3. Similarly, the separation between edges E2 and E3 of AND gates AND 5, AND 6 and AND 7 is less than that between their edges E1 and E4. In effect these reduced separations are governed by the dimensions of AND gate AND 1 which may be of minimum geometry size to increase spped and density per function.

In terms of a stored data base of chip types and geometries, therefore, it is a simple matter for a processor controlled architecture layout design to select and replicate the appropriately sized micro-cells of which a macro-cell of a given signal processing capability is to be configured. For the present example of the 4×4 multiplier, this is geographically illustrated in FIG. 8 which shows a processor-generated layout of the component micro-cells (AND gates, adders, multiplier cells) shown in FIG. 5. A similar processor-generated graphical layout of an N×M multiplier is shown in FIG. 9, where the signal processing capacity has been increased to N=5, M=7. Here, the identical types of micro-cells of the multiplier of FIGS. 5 and 8 are employed, but replication of a greater number of micro-cells is shown to provide the increased signal processing capacity requested by the system designer.

Once the chip architecture of each parametric macro-cell (such as the 4×4 multiplier corresponding to block C of FIG. 1) has been "customized" to fit the signal processing requirements of the functional components of the system design, chip real estate layout assignment is established and interconnections, including any necessary separate gate circuits, among the macro-cells are provided, as in customized chip layout design. As pointed out previously, for this purpose, the library of chip architecture components to which the designer has access may include some set of simple "standard cells" for intercoupling or "gluing" together parametric macro-cells. Similarly, where required an aggregate of auto-routed standard cells that are intercoupled with one or more macro-cells may be configured from this same library to form what may be termed a "pseudo macro" cell for effecting selected additional signal coupling functions on the chip. A particularly attractive feature of the present invention is that, because of the existence of a unified, processor-contained data base of the entire system, automatic placement routing and compaction of the entire set of parametric macro-cells can be accomplished.

As will be appreciated from the foregoing description, the parametric macro-cell approach to generating integrated circuit architectures for realizing digital logic system designs effectively enjoys an optimum blend of both customized and building block approaches to implementing large scale system circuit functions in a single semiconductor chip. The architecture methodology of the present invention offers the system designer a substantial variety of high level parametric macro-cell building blocks that are composed of a customized arrangement of a number of smaller but readily repeatable micro-cells. The size of each macro-cell, is determinable by design/performance/operational parameters of the system engineer. The internal configuration geometry and signal port connections of each microcell are customized for circuit packaging density, performance and interconnectability with other micro-cells.

As a result, the present invention offers to the system engineer a very high level design tool for realizing a system architecture that enjoys the manufacture repeatability of gate array and standard cell approaches, but also offers an eventual architecture design that has been customized by the circuit control parameters of the system level designer.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. A method of manufacturing an integrated circuit comprising the steps of:
  (a) storing a first library of a first plurality of different prescribed function-performing digital logic circuit devices of a first signal processing capacity capable of being implemented within said integrated circuit;
  (b) storing a second library of a second plurality of different prescribed function-performing digital signal processing devices of a second signal processing capacity greater than said first signal processing capacity and capable of being implemented within said integrated circuit by combinations of the digital logic circuit devices of said first library, prescribed characteristics of said second plurality of different prescribed function-performing digital signal processing devices being individually selectable, so that the signal processing function of a respective one of said second plurality of digital signal processing devices is established by a respective combination of plural ones of said first digital logic devices, thereby providing a respective signal processing device having said second signal processing capacity;
  (c) configuring said integrated circuit in the form of an interconnected arrangement of selected ones of the digital signal processing devices of said second library, prescribed characteristics of which are selected based upon signal processing parameters of said integrated circuit;
  (d) configuring said selected ones of the digital signal processing devices of said second library of respective combinations of selected ones of the digital logic circuit devices of said first library; and
  (e) forming an interconnected architecture of the selected ones of the digital signal processing devices of said second library as configured in step (d) in a body of semiconductor material, whereby a semiconductor chip architecture of said integrated circuit is realized.

2. A method according to claim 1, wherein digital logic circuit devices of said first library have geometries and signal port configurations such that they may be physically arranged with one another on said chip to provide two dimensional alignment thereamong, thereby effectively compacting the geometry of a respective signal processing device of said second library resulting from the physical arrangement of the digital logic circuit devices of said first library.

3. A method according to claim 1, wherein digital logic circuit devices of a respective digital logic function as contained within said first library include a plurality of differently sized typed so as to enable geometrical alignment with respect to digital logic circuit devices that perform other digital logic functions when combined therewith to form a respective signal processing device of said second library.

4. A method according to claim 1, wherein the signal processing devices of said second library include N-bit and N×M bit capacity digital signal processing devices, where N and M are integers.

5. A method according to claim 1, wherein the signal processing device of a second library include devices selected from a group consisting of a multi-bit register, a multi-bit comparator, a multi-bit ripple adder, a multi-bit random access memory, a multi-bit read only memory, a multi-word multiplier, a priority encoder and a multi-bit multiplexer.

6. A method according to claim 1, wherein said first signal processing capacity corresponds to single bit processing capacity, and said second signal processing capacity corresponds to a multi-bit processing capacity.

7. An integrated circuit comprising:
a body of semiconductor material in which is arranged an interconnected architecture of a first plurality of respective prescribed digital signal processing devices of a first signal processing capacity selected from a first library containing a first plurality of different digital signal processing devices implementable within an integrated circuit by respective combinations of selected ones of a second library containing a second plurality of respective digital logic circuit devices of a second signal processing capacity smaller than said first signal processing capacity, the geometries and signal port configurations of the digital logic circuit devices of said second library being such that they may be physically arranged with one another in said semiconductor body to provide two dimensional alignment thereamong when combined to form respective ones of the digital signal processing devices of said first library, and wherein digital logic circuit devices of a respective digital logic function as contained within said second library include a plurality of differently sized types so as to enable geometrical alignment with respect to digital logic circuit devices that perform other digital logic functions when combined therewith to form a respective digital signal processing device of said first library.

8. An integrated circuit comprising:
a body of semiconductor material in which is arranged an interconnected architecture of a first plurality of respective prescribed digital signal processing devices of a first signal processing capacity selected from a first library containing a first plurality of different digital signal processing devices implementable within an integrated circuit by respective combinations of selected ones of a second library containing a second plurality of respective digital logic circuit devices of a second signal processing capacity smaller than said first signal processing capacity, the geometries and signal port configurations of the digital logic circuit devices of said second library being such that they may be physically arranged with one another in said semiconductor body to provide two dimensional alignment thereamong when combined to form respective ones of the digital signal processing devices of said first library, and wherein digital logic circuit devices of a respective digital logic function as contained within said second library include a plurality of differently sized types so as to enable geometrical alignment with respect to digital logic circuit devices that perform other digital logic functions when combined therewith to form a respective digital signal processing device of said first library, and wherein the digital signal processing devices of said first library include N-bit and NXM bit capacity digital signal processing devices, where N and M are integers.

9. An integrated circuit comprising:
a body of semiconductor material in which is arranged an interconnected architecture of a first plurality of respective prescribed digital signal processing devices of a first signal processing capacity selected from a first library containing a first plurality of different digital signal processing devices implementable within an integrated circuit by respective combinations of selected ones of a second library containing a second plurality of respective digital logic circuit devices of a second signal processing capacity smaller than said first signal processing capacity, the geometries and signal port configurations of the digital logic circuit devices of said second library being such that they may be physically arranged with one another in said semiconductor body to provide two dimensional alignment thereamong when combined to form respective ones of the digital signal processing devices of said first library, and wherein digital logic circuit devices of a respective digital logic function as contained within said second library include a plurality of differently sized types so as to enable geometrical alignment with respect to digital logic circuit devices that perform other digital logic functions when combined therewith to form a respective digital signal processing device of said first library, and wherein the digital signal processing devices of said first library include devices selected from a group consisting of a multi-bit register, a multi-bit comparator, a multi-bit adder, a multi-bit random access memory, a multi-bit read only memory, a multi-word multiplier, a priority encoder and a multi-bit multiplexer.

10. An integrated circuit comprising:
a body of semiconductor material in which is arranged an interconnected architecture of a first plurality of respective prescribed digital signal processing devices of a first signal processing capacity selected from a first library containing a first plurality of different digital signal processing devices implementable within an integrated circuit by respective combinations of selected ones of a second library containing a second plurality of respective digital logic circuit devices of a second signal processing capacity smaller than said first signal processing capacity, the geometries and signal port configurations of the digital logic circuit devices of said second library being such that they may be physically arranged with one another in said semiconductor body to provide two dimensional alignment thereamong when combined to form respective ones of the digital signal processing devices of said first library, and wherein digital logic circuit devices of a respective digital logic function as contained within said second library include a plurality of differently sized types so as to enable geometrical alignment with respect to digital logic circuit devices that perform other digital logic functions when combined therewith to form a respective digital signal processing device of said first library, and wherein said second signal processing capacity corresponds to a single bit processing capacity and said first signal processing capacity corresponds to a multi-bit processing capacity.

* * * * *